UNITED STATES PATENT OFFICE

MAX E. GRUNEWALD, OF ALLENTOWN, PENNSYLVANIA

CEMENT COMPOSITION

No Drawing.   Application filed June 4, 1928.   Serial No. 282,894.

My invention relates to improvements in cement, and has particular reference to means for providing a cement having a uniform short setting time.

As is well known, if ordinary Portland cement, or other cements, is mixed with an excess of water, such as 1 part by weight of water, to 1 part by weight of cement, for producing a thin fluid grout, the fluid grout may not properly set. If the setting occurs, the cement settles in the water, with an accumulation of water above the same. When the fluid grout is introduced into water or mud, thus increasing the excess of water, the setting of the cement is further prevented. There is a tendency for the particles of the cement to be held in suspension in the water, with the result that a solid mass of concrete is not produced.

In accordance with my invention, by the use of my accelerating agent, combined with the cement and water, the cement will quickly begin to stiffen or set, in the presence of an excess of water, and will continue to stiffen or set until it has become completely set for producing a solid dense concrete.

My composition is adapted to be used for grout purposes generally, and may be used where there is an excess of free water or in mud or the like. The composition may also be used for precast work, producing artificial stone, or the like.

In accordance with my invention, I provide a cement composition including a ground cement clinker, such as a Portland cement clinker, or any other suitable cement clinker. I may add to this cement clinker, slag, such as a blast furnace slag, or any other suitable slag. If desired, the slag may be omitted. I also preferably add to the cement clinker, gypsum, which may be calcined or uncalcined gypsum. If desired, the gypsum may be omitted. The cement clinker with or without the slag or gypsum, constitutes the base of the cement, and to this base, I add an accelerating agent to cause the base to quickly stiffen or set, in the desired time, and under disadvantageous conditions. The accelerating agent which I employ is a water soluble salt of carbonic acid. I have found that particularly satisfactory results are obtainable by employing such water soluble salts as sodium carbonate, sodium bicarbonate, potassium carbonate, potassium bicarbonate, ammonium carbonate, or ammonium bicarbonate. Experiments which I have conducted indicate that various other water soluble salts of carbonic acid are suitable for this purpose.

As an example of an embodiment of my invention, I produce a cement composition embodying the following ingredients, employed in the proportions stated:

100 parts by weight of ground Portland cement clinker,
3 parts by weight of ground gypsum, and
1 part by weight of sodium carbonate.

As a further example of an embodiment of my invention, I produce a cement composition embodying the following ingredients, employed in the proportions stated:

100 parts by weight of ground Portland cement clinker,
50 parts by weight of ground slag,
4 parts by weight of ground gypsum, and
2 parts by weight of sodium carbonate.

It is preferred to grind the Portland cement clinker, with or without the slag, with the gypsum, and subsequently add the sodium carbonate, although these ingredients may be ground together. These ingredients are thus mixed in a dry state and are stored in bins or packed in bags or other containers, ready for the market.

The cement composition thus produced is mixed with water, and I may add as high as 100 parts by weight of water to 100 parts by weight of the cement composition. To the cement composition and water, I may add sand, or mineral aggregates of selected sizes. I may preferably add 100 parts by weight of the sand or aggregates, while the sand or aggregates may be omitted. This will produce a thin fluid grout, which may be poured, forced through tubes, or pumped to the desired position, or sprayed. The fluid grout will quickly begin to stiffen or set and will produce a solid dense concrete.

I have discovered that the rapidity at which the composition will stiffen or set, may be regulated by regulating the amount of the accelerating agent employed. The accelerating agent may be added in from 1/20 of 1 per cent to 10 per cent by weight with respect to the weight of the base. The greater the amount of the accelerating agent, the more rapid will be the stiffening or setting action of the product.

The amount of water to be added to the composition may be varied widely, and the amount of the accelerating agent may also be varied in proportion to the amount of water. Thus where the amount of water is increased, a larger amount of the accelerating agent is also used, to obtain the same stiffening or setting time of the mass.

It is to be understood that the form of my invention herewith shown and described, is to be taken as a preferred embodiment of the same, and that various changes may be resorted to in the proportions of the several ingredients, and that chemical equivalents may be employed, without departing from the spirit of my invention, or the scope of the subjoined claims.

Having thus described my invention, I claim:—

1. A thin fluid grout comprising approximately 100 parts by weight of ground cement, 1/20th of 1% to 10% by weight of sodium carbonate, approximately 100 parts by weight of water, and approximately 100 parts by weight of divided inert material.

2. A thin fluid grout comprising approximately 100 parts by weight of ground cement, approximately 1 part by weight of sodium carbonate, approximately 100 parts by weight of water and approximately 100 parts by weight of sand.

In testimony whereof I affix my signature.

MAX E. GRUNEWALD.